Feb. 25, 1941.　　D. G. MacKENZIE　　2,233,083
LOGGING HOOK
Filed Nov. 12, 1936

Inventor:
Donald G. MacKenzie,
By Potter, Pierce & Scheffler,
Attorneys.

Patented Feb. 25, 1941

2,233,083

UNITED STATES PATENT OFFICE 2,233,083

LOGGING HOOK

Donald Grant MacKenzie, Woodworth, Mont.

Application November 12, 1936, Serial No. 110,547

4 Claims. (Cl. 294—74)

This invention relates to a choker hook rigging of the general type commonly used in the logging industry.

Such devices include a choker line or wire rope having enlarged ends between which some form of hook member is slidable on the rope, one enlarged end of the cable being adapted to be detachably seated in the hook member to form a choker or slip noose for encircling a log. Some of the prior choker hook riggings have included expensive hook member constructions and, in general, the hook members were so formed as to cause considerable wear and tear on the rope immediately adjacent the ferruled end which is seated in the hook member.

An object of the present invention is to provide a simple and inexpensive choker hook rigging in which there is little or no wear upon the wire rope adjacent the hook member. An object is to provide a choker hook rigging in which the surfaces of the hook adjacent the ferrule seat are curved to prevent wear upon the wire rope or cable. A further object is to provide a choker hook rigging including a hook in the form of a closed link of keyhole shape. More particularly, an object is to provide a choker hook rigging of the type last stated in which the ends of the closed link or hook lie in angularly disposed planes, the larger end of the hook being held against the surface of a log when power is applied to the sling and the smaller end of the hook being tilted at an angle to the surface of the log.

These and other objects and advantages of the invention will be apparent from the following specification when taken with the accompanying drawing in which.

Figure 1:
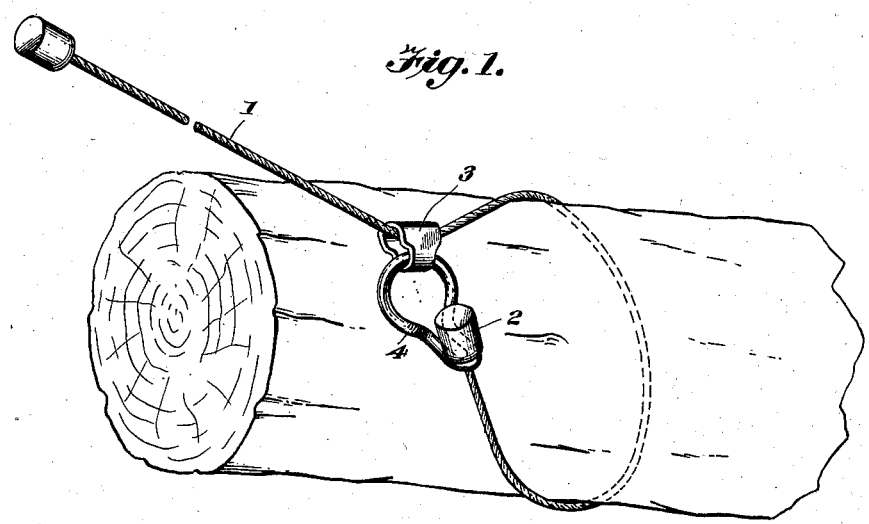
Fig. 1 is a fragmentary perspective view of the invention as applied to the end of a log.
Figure 2:
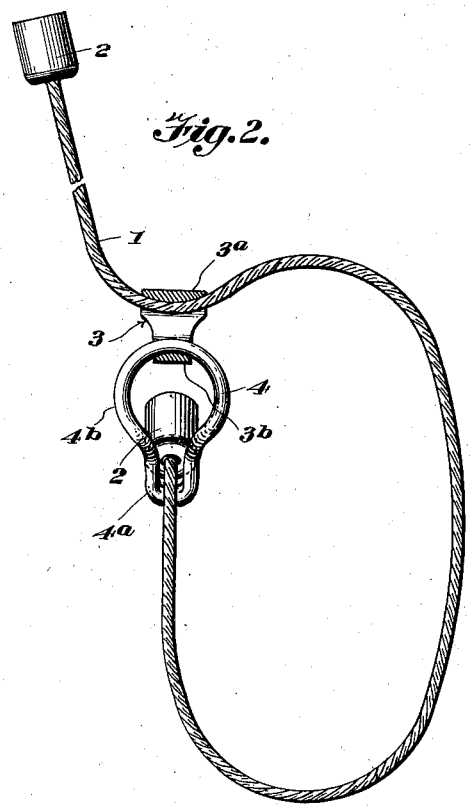
Fig. 2 is an elevation of the choker hook rigging as viewed from the rear of Fig. 1 and on a plane passing through the slide ring.

In the drawing, the reference numeral 1 identifies a wire rope or cable having ferrules 2 securely attached to the opposite ends thereof. These parts are or may be of the usual design and the cable may be of any desired or appropriate length.

The hook member assembly comprises a slide ring or sleeve 3 through which the cable 1 passes, and which carries the closed link 4 of keyhole shape which constitutes the "hook" for anchoring the ferruled end of the cable. The sleeve 3 preferably has only a single opening in which both the cable and one edge of the hook 4 are located, but all jamming of the hook and cable is prevented when the sleeve 3 has one relatively long edge 3a for sliding along the cable and a shorter edge 3b on which the hook is slidable, the dimensions being so chosen that the cable 1 and hook 4 will not slip past each other within the sleeve to bring the shorter edge 3b against the cable 1.

The link or hook 4 is preferably formed by bending a short section of heavy steel wire or light rod, preferably of circular cross-section, to the desired keyhole shape, and bending the smaller or slotted end 4a at an acute angle, preferably about 45°, to the plane of the circular or main section 4b of the hook. The ends of the blank are welded together after the shaped hook is passed through the sleeve 3.

Figure 3:
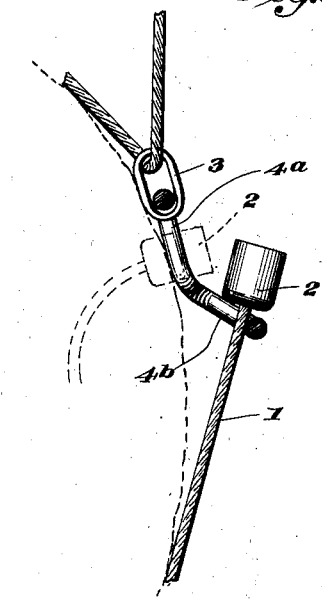
Fig. 3 is a fragmentary sectional view as seen on a plane passing through the center of the hook and from the left side of Fig. 1.

The internal diameter of the eye or larger section 4b of the hook is somewhat greater than that of the ferrules 2 to permit the latter to pass freely into the hook when presented axially or approximately axially of the eye section 4b from the log-engaging side, as shown in dotted line in Fig. 3. The slot or jaw section 4a provides a seat for the ferrule 2 when, as the workman drops the hook and the cable end after passing the ferrule through the eye section, the cable 1 moves through its inherent stiffness towards the closed end of the slot, and the slot is substantially wider than the diameter of the cable 1 to permit the ferrule to adjust itself on the jaw section 4a without bending or cramping the cable. The width of the slot is preferably smaller than the length of section 3b of the sleeve to prevent the displacement of the hook through 180° with respect to the sleeve.

A pull applied to the outer end of the cable 1 will draw the loop tightly about the log, and the several parts take positions which are best adapted to establish minimum stresses in the cable and hook members. As shown in Fig. 3, the hook or link 4 rocks about the junction of the eye and jaw sections as the loop tightens, and this motion tilts the jaw section away from the log. The stress in the end portion of the cable 1 is along the axis of the cable, and the ferrule 2 adjusts itself on the jaw section 4a under this direct pull along the cable. The opening into the jaw section 4a is closed by the adjacent surface of the log and the ferrule 2 cannot slip out through the eye section in the event of slack in the cable. The amount of slack required to engage or to release the cable is quite small as the hook may be rocked counter-clockwise, as viewed in Fig. 3, by the workman when there is any slack in the cable loop, thus permitting a full release of the hook without bending the cable. Accidental release is impossible so long as there is a pull on the cable, and is practically impossible at any amount of slack as the stiffness of the cable retains it in the jaw end of the hook.

The choker hook rigging may be used outside of the logging industry, for example in the pulling of piles and hoisting of cargo and heavy machinery. The sleeve and hook members will rock with respect to each other and to the cable in accordance with the stresses set up in the cable. The welded link type of hook has the advantages of low production costs and of rounded contours which avoid a cutting or a sharp bending of the anchored end of the cable 1. The size, strength and relative proportions of the parts may be varied to adapt the rigging for different conditions of use without departing from the spirit of my invention as set forth in the following claims.

I claim:

1. A choker hook rigging comprising a cable having ferruled ends, and means slidable along said cable for receiving one ferruled end thereof to form a choke, said means comprises a closed link of metal of substantially uniform cross-section defining an opening of keyhole shape with an eye section for axially receiving the ferruled end and a jaw section dimensioned to pass the cable freely and to arrest the ferruled end thereof, the plane of said jaw section being inclined at an acute angle to the plane of said eye section.

2. A choker hook rigging as claimed in claim 1, wherein the inner face of said enlarged end of the cable is rounded to prevent bending of the immediately adjacent portion of the cable at the hook when the enlarged head is seated on the inclined jaw section of the hook.

3. A choker hook rigging comprising a cable having ferrules at the ends thereof, a sleeve slidable on said cable and retained thereon by said ferrules, and a band of metal of substantially circular and constant cross-section constituting a link of keyhole shape pivoted upon said sleeve; said link having an eye portion for passing the ferrule at an end of the link and a jaw portion offset at an acute angle to the eye portion for freely passing the cable and arresting the ferrule that was passed through the eye portion of the link, the inner end of the ferrule which seats on the link being rounded to preclude bending of the immediately adjacent portion of the cable on the link.

4. A hook assembly for use with a cable to form a choker hook rigging, said assembly comprising a sleeve to be fitted upon the cable, and a hook extending through and pivotally supported by said sleeve, said hook comprising a closed link of metal of substantially uniform cross-section defining an opening of keyhole shape.

DONALD GRANT MacKENZIE.